US005970190A

United States Patent [19]
Fu et al.

[11] Patent Number: 5,970,190
[45] Date of Patent: Oct. 19, 1999

[54] GRATING-IN-ETALON POLARIZATION INSENSITIVE WAVELENGTH DIVISION MULTIPLEXING DEVICES

[75] Inventors: Xiaoli Fu, Toronto; JingMing Xu, Oakville, both of Canada

[73] Assignee: Photonics Research Ontario, Ontario, Canada

[21] Appl. No.: 08/982,690

[22] Filed: Dec. 2, 1997

Related U.S. Application Data

[60] Provisional application No. 60/031,538, Dec. 2, 1996.

[51] Int. Cl.$^6$ ................................................ G02B 6/34
[52] U.S. Cl. .......................................................... 385/37
[58] Field of Search ........................ 385/14, 37; 359/578, 359/579

[56] References Cited

U.S. PATENT DOCUMENTS

| | | |
|---|---|---|
| 3,498,693 | 3/1970 | Fein et al. . |
| 4,871,235 | 10/1989 | Greene et al. ............................ 372/21 |
| 5,119,454 | 6/1992 | McMahon ................................. 385/49 |
| 5,144,498 | 9/1992 | Vincent . |
| 5,321,539 | 6/1994 | Hirabayashi et al. ................... 359/578 |
| 5,664,032 | 9/1997 | Bischel et al. ............................ 385/37 |

OTHER PUBLICATIONS

Friday Morning/CLEO '96, pp. 513–514, Friday, Jun. 7, 1996.

IEEE Photonics Technology Letters, vol. 3, No. 10, pp. 896–899, Integrated Optics N×N Multiplexer on Silicon, C. Dragone, C.A. Edwards and R.C. Kistler.

Appl. Phys. Letter, vol. 69, No. 10, Sep. 2, 1991, pp. 1144–1146, Highly Multiplexed Graded–Index Polymer Waveguide Hologram For Near–Infrared Eight–Channel Wavelength Division Demuliplexing, Ray T. Chen, Huey Lu, Daniel Robinson, and Tomasz Jannson.

Electronics Letters, Jan. 17, 1991, vol. 27 No. 2, pp. 132–134, Monolitchi InP–Grating Spectrometer For Wavelength–Division Multiplexed Systems At 1–5μm.

IEEE Photonics Technology Letters, vol. 4, No. 10, Oct. 1992, pp. 1115–1117, Diffraction Characteristics of Superimposed Holographic Gratings in Planar Optical Waveguides, V. Minier, A. Kevorkian, and J.M. Xu.

(List continued on next page.)

Primary Examiner—Rodney Bovernick
Assistant Examiner—Robert E. Wise
Attorney, Agent, or Firm—Dowell & Dowell, P.C.; Lynn Schumacher; Hill & Schumacher

[57] ABSTRACT

A grating-in-etalon wavelength division multiplexing device is disclosed. In one aspect the device includes an etalon structure with a single volume (or Bragg) diffraction grating, multiple superimposed volume diffraction gratings or a binary volume supergrating is interposed between the reflective opposed faces of the etalon. The etalon includes a tilt mechanism for tilting one or both of the reflective faces at a preselected angle with respect to each other from the parallel. A multiple wavelength light beam is directed through the volume grating in different preselected directions so that light of wavelengths satisfying the Bragg condition on each traversal of the grating is diffracted in a direction different from the direction of the incident beam. The diffracted beam exits the etalon and is wavelength interrogated in a detector while the undiffracted wavelengths propagate through the grating to be reflected from the opposed mirror face back through the volume grating. On this traversal the diffracted light exits through the other side of the etalon and is wavelength interrogated in another wavelength sensitive light detector. In another aspect of the invention the WDM device is fabricated from an etalon waveguide with reflective opposed faces and having a Bragg grating (or multiple gratings) written into the waveguide between the reflective faces. Polarization insensitivity is achieved by writing in two sets of gratings, one set to diffract ordinary polarized light and the other to diffract extraordinary polarized light so that when polarization state of light changes, the diffraction efficiencies are relatively the same.

24 Claims, 3 Drawing Sheets

OTHER PUBLICATIONS

Journal of Lightwave Technology, vol. 6, No. 6, Jun. 1988, pp. 1011–1015, Integrated Four–Channel Mach–Zehnder Multi–Demultiplexer Fabricated With Phosphorous Doped SiO$_2$ Waveguides on Si, B. H. Verbee; C. H. Henry; N. A. Olsson; K. J. Orlowsky; R. F. Kazarinov; Nd B. H. Johnson.

IEEE Photonics Technology Letters, vol. 3, No. 10, Oct. 1991, pp. 899–901, Grating–Assisted Directional Coupler Filters Using A1GaAs/GaAs MQW Waveguides, Hajime Sakata and Shinsuke Takeuchi.

GRATING-IN-ETALON POLARIZATION INSENSITIVE WAVELENGTH DIVISION MULTIPLEXING DEVICES

CROSS REFERENCE TO RELATED U.S. PATENT APPLICATION

This patent application relates to U.S. Provisional Patent Application Ser. No. 60/031,538, filed on Dec. 2, 1996, entitled GRATING-IN-ETALON POLARIZATION INSENSITIVE WAVELENGTH DEMULTIPLEXING DEVICE.

FIELD OF THE INVENTION

The present invention relates to wavelength division multiplexing (WDM) devices and more particularly to grating-in-etalon WDM devices.

BACKGROUND OF THE INVENTION

Wavelength division multiplexing (WDM) devices are becoming increasingly important in fiber-optics sensing systems and optical communication systems to enhance transmission capacity and application flexibility. Several WDM devices are known including Mach-Zehnder interferometers (B. H. Berbeck, C. H. Henry, N. A. Olsson, K. J. Orlowsky, R. F. Kazarinow, and B. H. Johnson, "Integrated Four-Channel Mach-Zehnder Multi/demuliplexer Fabricated With Phosphorous Doped $SiO_2$ Waveguide On Si," J. Lightwave Technol., Vol. 6, pp.1011, 1988), arrayed waveguide gratings (H. Takahashi, S. Suzuki, K. Kato, and I. Nishi, "Arrayed-Waveguide Grating For Wavelength Division Multi/demuliplexer With Nanometer Resolution," Electron. Lett., Vol. 26, pp. 87, 1990), planar spectrometers (J. B. D. Soole et al, "Monolithic InP-based Grating Spectrometer For Wavelength Division Multiplexed Systems At 1.5 $\mu$m," Electron. Lett., Vol. 27, pp. 132, 1990), and directional couplers (H. Sakata, S. Takeuchi, "Grating-Assisted Directional Coupler Filters Using AlGaAs/GaAs MQW Waveguides," IEEE Photonics Technol. Lett., Vol. 3, pp.899, 1991). For anticipated devices to be used in for example fiber-to-home applications, large-channel fanout, low loss and compatibility with fiber connections, laser sources and detectors will be advantageous features of WDM devices. Dual-functionality of wavelength selection and beam splitting are also desirable properties. Bragg grating devices which posses the advantage of high diffraction efficiency, high wavelength selectivity and high angular selectivity have received considerable attention in recent years, see for example R. T. Chen, H. Lu, D. Robinson and T. Jannson, "Highly Multiplexed Graded-Index Polymer Waveguide Hologram For Near-infrared Eight-Channel Waveguide Division Multiplexing," Appl. Phys. Lett., Vol. 59, pp. 1145, 1991, and C. H. Henry, R. F. Kazarinov, Y. Shani, R. C. Kistler, C. Plo, K. J. Orlowsky, "Four Channel Wavelength Division Multiplexers And Bandpass Filter Based On Elliptical Bragg Reflector", J. of Lightwave Technol., Vol.8, pp. 748,1990.

U.S. Pat. No. 3,498,693 issued to Fein et al. is directed to an optical filtering device using an etalon having two spaced mirrors that are partially transmitting. By varying the distance or tilt between the mirrors the wavelength selection is achieved for wavelengths satisfying the resonance condition.

U.S. Pat. No. 5,119,454 issued to McMahon teaches an optical wavelength division multiplexer having an etalon-like structure defined by a pair of opposed mirror surfaces with a planar diffraction grating formed on one of the reflective mirror surfaces. Wavelength selection in this device is achieved by tuning of the resonant condition along the length of the etalon-like structure and the diffraction grating is used to change the direction of propagation of the light beam.

U.S. Pat. No. 5,144,498 issued to Vincent is directed to a variable wavelength light filter and sensor. The device uses an etalon structure in which the wavelength filtering function is achieved by utilizing the dependence of the resonance condition along the length of the etalon.

For high density and large fan-out WDM applications, the number of gratings in a superimposed grating structure is constrained by signal-to-noise ratio, see (V. Minier, A. Kevorkian, J. M. Xu, "Diffraction Characteristics Of Superimposed Holographic Gratings In Planar Optical Waveguide", IEEE Photonics Tech. Lett. Vol. 4(10), pp. 1115, 1992), and by the limited refractive index modulation depth of the material; on the other hand, cascaded gratings span a large physical dimension. Polarization sensitivity is also a drawback of known grating based WDM devices.

Therefore, it would be very advantageous to provide a WDM device exhibiting wavelength selectivity, high diffraction sensitivity, high angular selectivity and beam splitting that is polarization insensitive.

SUMMARY OF THE INVENTION

It is an object of the present invention to provide a wavelength division multiplexing device of simple construction with dual-functionality of wavelength selection and beam splitting. It is also an object of the present invention to provide a wavelength division multiplexing device that is polarization insensitive.

The present invention provides a wavelength division multiplexing device comprising an etalon means having a pair of opposed faces, the opposed faces each having a face portion thereof which is highly reflective. The highly reflective face portions being disposed at a preselected angle with respect to each other, the preselected angle being non zero such that the highly reflective face portions are non-parallel with respect to one another. The device includes a volume diffraction grating means positioned between the highly reflective opposed face portions so that a light beam incident on the etalon means undergoes a preselected number of multiple reflections between the highly reflective face portions and a preselected number of traversals through the volume diffraction grating means, and whereby wavelengths satisfying a Bragg condition on each traversal is diffracted out of the volume diffraction grating means.

In this aspect of the invention the etalon means may be an etalon having spaced highly reflecting face portions with the volume diffraction grating means positioned between the face portions and spaced therefrom.

In this aspect of the invention the etalon means may be an etalon waveguide comprising a substrate, a waveguide on a surface of the substrate, the waveguide having a pair of first highly reflective opposed end faces, the volume diffraction grating means being located in the waveguide, the waveguide having a second pair of opposed output faces through which the diffracted light beams exit. The volume diffraction gratings may be conventional single Bragg gratings, multiple superimposed Bragg gratings or binary Bragg supergratings.

In this aspect of the invention two gratings may be used, a first of gratings being operable to diffract ordinary polarized light and a second grating being operable to diffract extraordinary polarized light.

In another aspect of the invention there is provided a method of wavelength division multiplexing. The method comprises providing a volume diffraction means between reflective faces disposed at a preselected angle that is non-zero such that the reflective faces are non-parallel with respect to one another and multiply reflecting a beam of light through the volume diffraction grating means for a preselected number of traversals with each traversal of the beam through the volume diffraction grating means being in a different preselected direction whereby light satisfying a Bragg condition during the traversals is diffracted in a direction different from light diffracted during other traversals through the volume diffraction grating means. The method includes detecting light diffracted in the different directions for each traversal of the light beam through the volume diffraction grating means.

BRIEF DESCRIPTION OF THE DRAWINGS

The following is a description, by way of example only, of a wavelength division multiplexing device constructed in accordance with the present invention, reference being had to the accompanying drawings, in which.

DETAILED DESCRIPTION OF THE INVENTION

Figure 1:
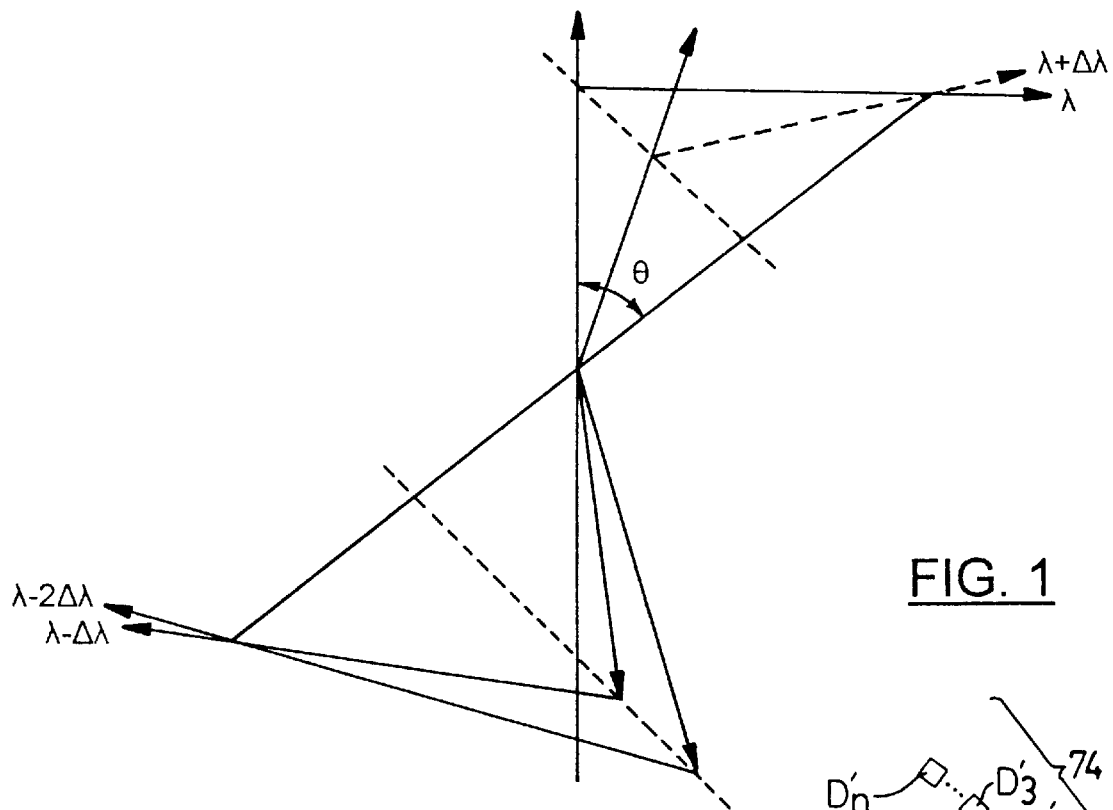
FIG. 1 illustrates the principle of multiple pass Bragg grating structures at different angles for WDM applications.

The WDM device disclosed herein operates using a volume diffraction grating. Referring first to FIG. 1, the WDM functionality of the device disclosed herein is achieved by passing a multiple-wavelength input light beam through the same grating region at different carefully chosen directions. As shown in FIG. 1, at different incident directions, different wavelengths (corresponding to different wavevector lengths in FIG. 1) can satisfy the Bragg condition. Only the wavelength with the proper Bragg wavelength will be efficiently diffracted. If incident light of wavelength $\lambda$ satisfies the Bragg condition, and the angle between the grating vector and the incident wavevector is $\theta$, when this angle slightly changes to $\theta+\Delta\theta$, the selected wavelength will change to $\lambda+\Delta\lambda$.

Figure 2:
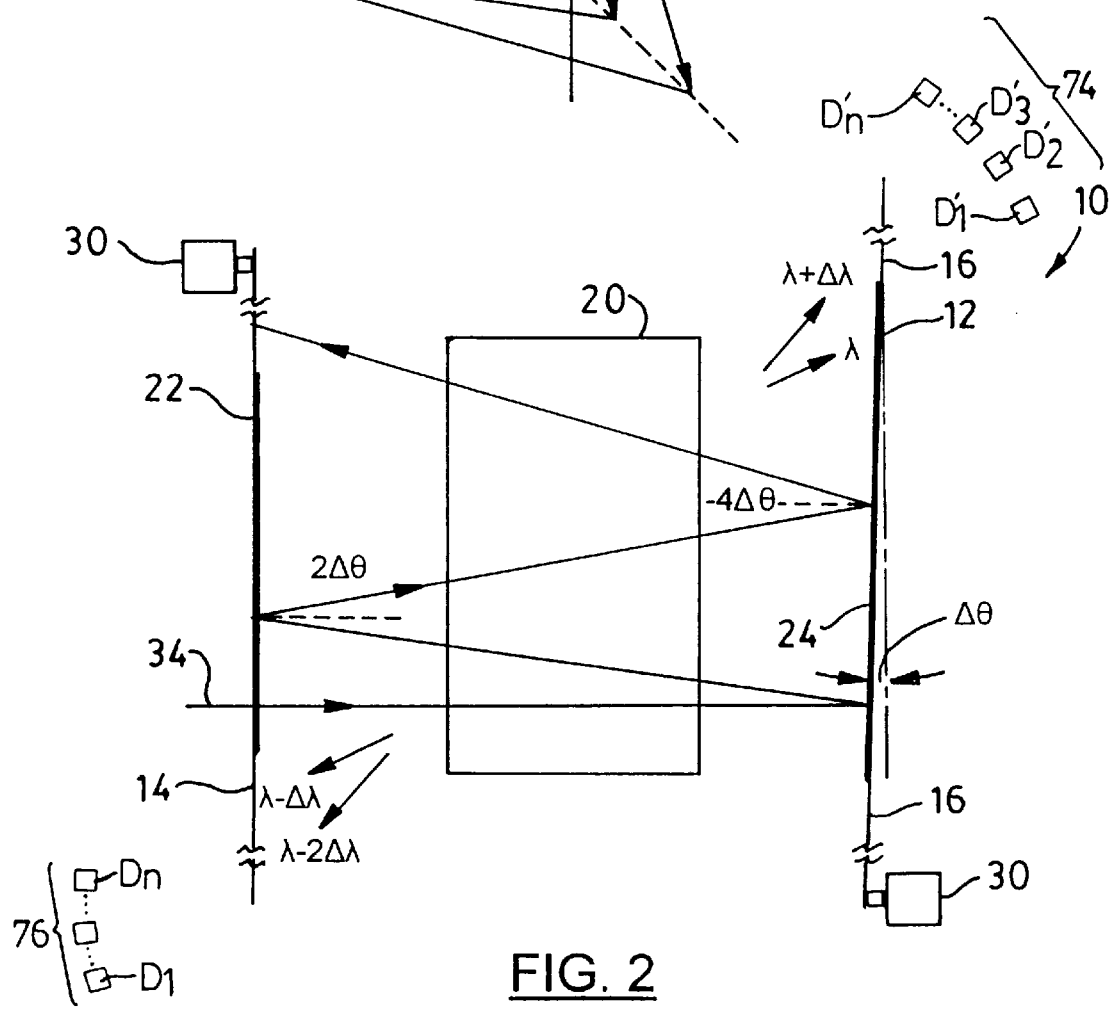
FIG. 2 is a cross sectional view of one example of a grating-in-etalon device constructed in accordance with the present method.

This is implemented using the grating-in-etalon device shown generally at 10 in FIG. 2. The WDM device 10 includes an etalon 12 comprising a pair of spaced, opposed faces 14 and 16. Faces 14 and 16 have respectively highly reflective portions 22 and 24 which may be formed by coating a portion of a two substrates, such as glass, with a reflective metal coating. The term etalon in the art defines a configuration comprising substantially parallel, highly reflective faces separated by a preselected distance as opposed to an interferometer in which one face moves with respect to the other face while remaining strictly parallel thereto. The term etalon as used herein refers to a device comprising a pair of spaced mirrors or highly reflective surfaces which has an angle between the mirrors that may be fixed or adjustable. WDM device 10 comprises a volume (or Bragg) grating 20 interposed between these highly reflective portions of faces 14 and 16.

The grating structure 20 may comprise a conventional single Bragg grating, multiple superimposed Bragg gratings, or a binary Bragg supergrating, see V. Minier, A. Kevorkian and J. M. Xu, "Diffraction Characteristics of Superimposed Holographic Gratings in Planar Optical Waveguide", IEEE Photonics Tech. Lett. Vol. 4(10), pp. 1115, 1992; and J. Bismuth, A. Othonos, M. Sweeny, A. Kevorkian, J. M. Xu, "Superimposed Gratings WDM on Ge-doped Silica On Silicon Planar Waveguide", OSA 1996, Technical Digest Series, Vol. 9, pp. 513, Conference On Laser And Electronico-Optics (CLEO), Anaheim, Calif., Jun. 2–7, 1996. In addition, the wavelength demultiplexing device constructed in accordance with the present invention may comprise two sets of volume gratings to diffract transverse electric (TE) and transverse magnetic (TM) waves when it is necessary to avoid problems associated with polarization dependence.

The WDM device 10 includes a mechanism 30 for adjustably tilting the faces 14 and 16 at a small angle $\Delta\theta$ with respect to each other from the parallel. However, it will be understood that only one reflective surface needs to be tiltable or adjustable with respect to the other mirror. A wavelength sensitive detector array 76 comprising detectors $D_1$ to $D_n$ are positioned to intercept the beams diffracted out of one side of volume grating 20 at the different angles as discussed below and another detector array 74 comprising detectors $D'_1$ to $D'_n$ is on the other side of the grating with each positioned to intercept a particular wavelength diffracted out of the grating.

After the first pass of the input beam 34 through grating 20 the light having wavelengths satisfying the Bragg condition $\lambda+n\Delta\lambda$ (n=0, 1, 2, ...) is diffracted and this light exits the etalon as seen in FIG. 2 through the non-reflecting portion of face 14 to be intercepted and detected by a detector in array 76. The beam containing wavelengths not diffracted continues to propagate through grating 20 towards the tilted face 16 and is back-reflected from reflective portion 24 back into grating 20 but at an angle of $-2\Delta\theta$. The beam again propagates back through grating 20 but because it traverses through grating 20 at a different angle, the Bragg condition is changed so that different wavelengths $\lambda-n\Delta\lambda$ are diffracted which also exits the waveguide with these diffracted beams being intercepted and detected by detectors in array 74. The undiffracted beam propagates through grating 20 and is back-reflected from reflective portion 22 at an angle $+2\Delta\theta$ with respect to the original input angle. This process is repeated until the last wavelength is diffracted. The wavelength-angle relation may be found from the analysis of the wave and grating vectors illustrated in FIG. 1. The wavelength selectivity is given by:

$$\Delta\lambda/\lambda=\tan(\theta/2)\Delta\theta$$

where $\theta$ as it is shown in FIG. 1 is the angle between the input wavevector and the grating wavevector. For example, in the case of $\lambda=1.5$ $\mu$m, $\Delta\lambda=2.0$ nm, $\theta=40°$, we get $\Delta\theta=0.21°$. It will be understood that the same principles apply to a supergrating-in-etalon configuration and is not limited to any particular grating material or any method of forming the grating(s). The volume or Bragg gratings may be fabricated from polymers, glass, semiconductor materials such as GaAs, Si, etc. It will be understood that the choice of material from which the volume grating is produced will depend on the wavelength region in which the WDM device is to operate. A viable volume grating must be fabricated using materials which transmit light in the wavelength region of interest.

Figure 2A:
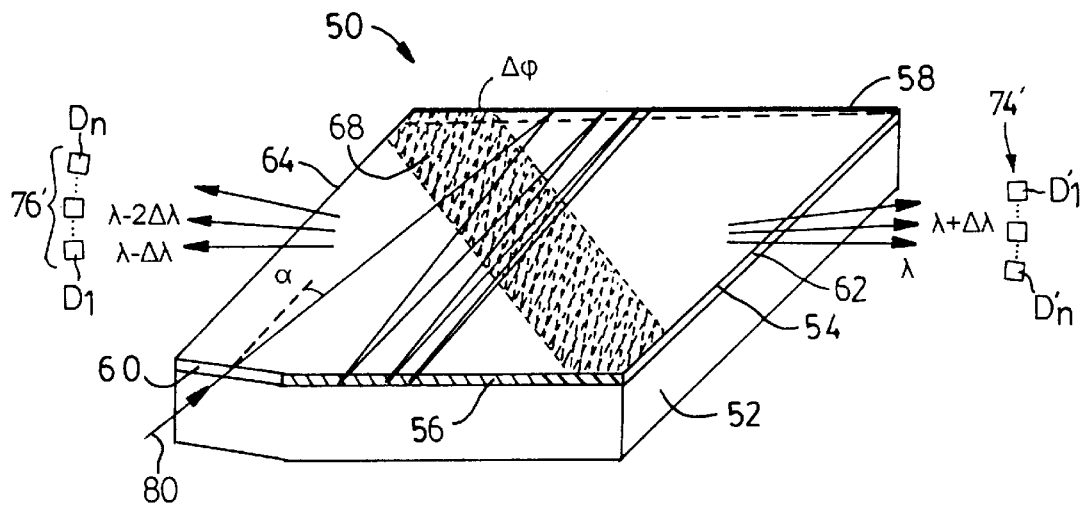
FIG. 2a is a perspective view of an alternative embodiment of a grating-in-etalon device.

FIG. 2 illustrates an embodiment of the present WDM device comprising an etalon with a volume grating interposed between the reflective mirrors and the angle of one or both of the mirrors being independently adjustable with respect to each other. FIG. 2a illustrates another embodiment of a WDM device constructed in accordance with the present invention comprising a waveguide etalon with a volume grating region embedded inside the waveguide. More specifically, the WDM device shown generally at 50 includes a waveguide etalon comprising a substrate 52 having a waveguide 54 on substrate 52. Waveguide 54 has one face 58 tilted with respect to an opposing face 56 at a fixed angle $\Delta\phi$ (the dotted line being parallel to face 56). Face 58 and a portion of opposing face 56 are each coated with a highly reflective coating. Input face portion 60 (adjacent to face portion 56) and opposing output faces 62 and 64 are coated with an antireflection coating. A Bragg grating 68 is embedded in waveguide 54 between the reflective opposing face 58 and face portion 56. The grating 68 is designed and orientated so that when a light beam is directed by the etalon through the grating the beam is multiply reflected through the grating in preselected directions so that light with wavelength satisfying the Bragg condition on each traversal is selectively diffracted in preselected directions.

Detector arrays 74' and 76' are located with respect to output faces 62 and 64 respectively to intercept the separated beams of differing wavelengths. The detector arrays may be mounted (or fabricated) directly on the substrate at the output faces or may be separate and spaced from the waveguide as shown in FIG. 2a.

In operation, a light beam 80 is directed into waveguide 54 through the antireflection coated input portion 60 and after a first pass of the input beam through the grating region 68 at an angle $\alpha$, light whose wavelength satisfies the Bragg condition is diffracted and propagates out through output face 64 to detector $D_1$ in detector array 76'. The rest of the beam continues to propagate toward the tilted face 58 and is reflected back into the grating region 68, but this time at an angle of $-(\alpha-2\Delta\phi)$. Due to the different incident angle, in the second pass, light of a slightly different wavelength is diffracted and propagates out through output face 62 into detector $D'_1$ in detector array 74'. The rest of the light beam propagates back toward face portion 56 and is reflected back at an angle $\alpha-2\Delta\phi$ with the diffracted beam being detected by detector $D_2$. This process is repeated until the last qualified wavelength is diffracted.

The angle $\Delta\phi$ between opposed reflective faces 56 and 58 will depend on several different considerations, for example, the particular application of the device, the materials of construction of the etalon waveguide, and the wavelengths being demultiplexed by the WDM device to mention just a few. The Bragg grating 68 may be written directly into the waveguide 54 as shown in FIG. 2a or alternatively, a cladding layer on top of waveguide 54 may be included and the Bragg grating written into this cladding layer.

Figure 3:
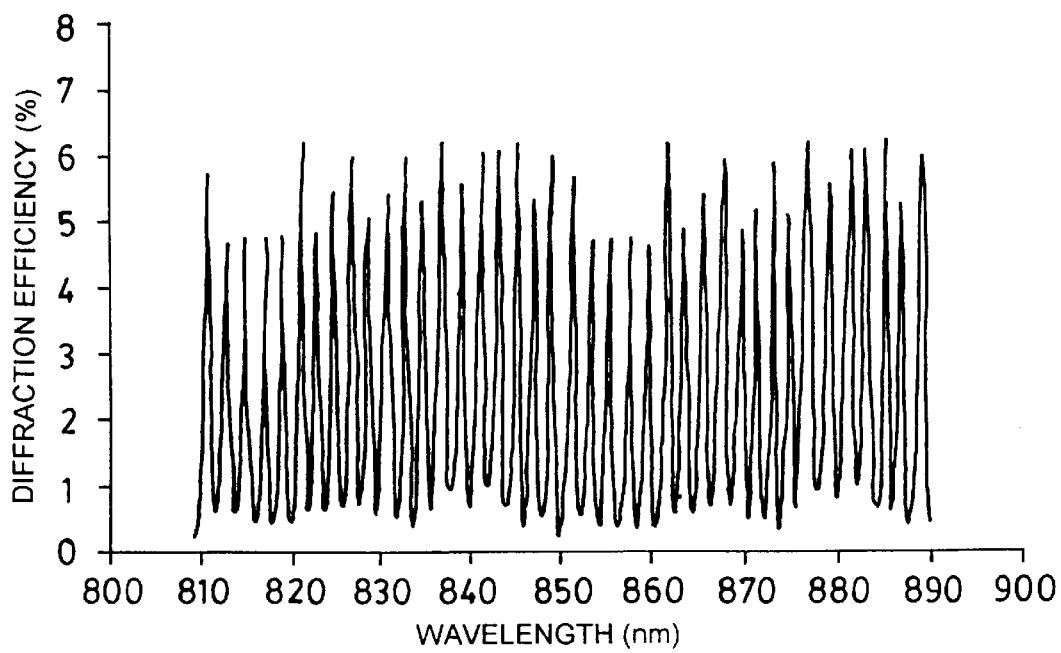
FIG. 3 is an example of a plot of diffraction efficiency versus wavelength for the output passband spectrum for a multiple superimposed grating with two passes for wavelength demultiplexing using the device of FIG. 2.
Figure 4:
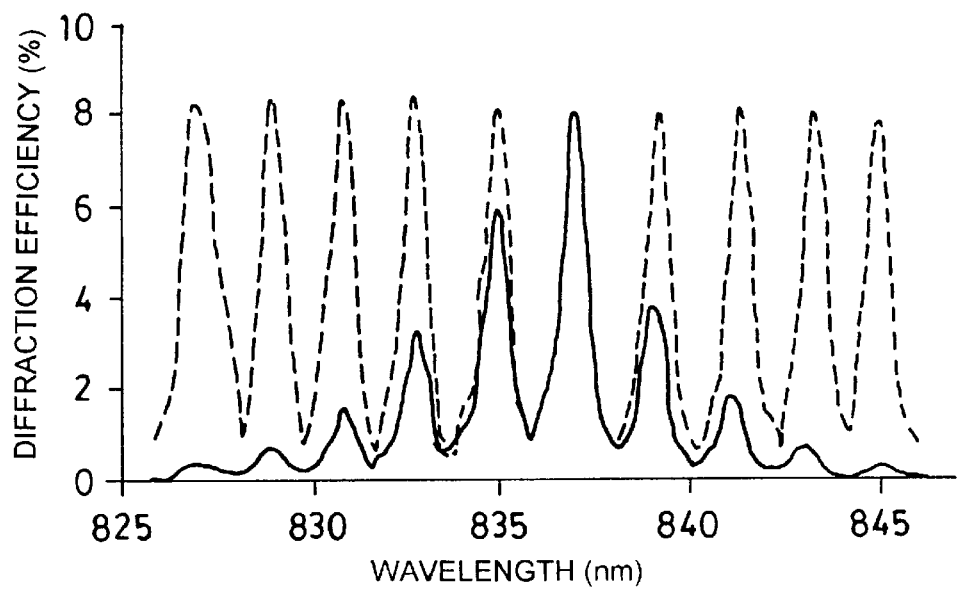
FIG. 4 is an example of a plot of diffraction efficiency versus wavelength for the output passband spectrum of a single grating-in-etalon 1×10 WDM with 10 passes for multiple wavelength demultiplexing using the device of FIG. 2.

FIGS. 3 and 4 illustrate data taken using $LiNbO_3$ based single and multiple gratings using the grating-in-etalon configuration illustrated in FIG. 2. Twenty gratings were written in $LiNbO_3$ using argon laser at 488.0 nm. To obtain substantially uniform diffraction efficiency, an iterative exposure technique was used. The exposure time for each grating each time is equal and short, but the exposure procedure was repeated several times. The writing beam angle in air was chosen to be 40°, yielding a diffraction wavelength range within that of the Ti:Sapphire laser source. Multiple gratings were written in the crystal by rotating the crystal horizontally 0.10° each time. The gratings were approximately 2 mm thick and the resultant diffraction efficiencies were about 8%. The wavelength selectivity of each resultant grating was about 2 nm.

FIG. 3 illustrates the output passband spectrum after two passes through a set of 20 gratings written on a $LiNbO_3$ crystal in which forty wavelength channels spaced 2 nm apart were successfully demultiplexed from a common input port. It is noted that a significant advantage of the present invention is that through the use of the types of configurations disclosed herein, the number of demultiplexed channels doubles that of the original with two passes. The diffraction efficiencies can be adjusted by varying the grating strength, i.e. the amount of index change of the grating pitches and varying the length of the grating 20.

As a second demonstration, FIG. 4 illustrates the output passband spectrum of a single grating-in-etalon configuration with multiple passes obtained by use of external reflecting mirrors having reflection coefficients of R1=90% and R2=99%. $LiNbO_3$ was the grating material. The variation of the measured diffraction efficiencies over the wavelength range was consistent with the loss due to the mirrors and crystal facets (the facet refraction loss is about 15% on each side).

Figure 5:
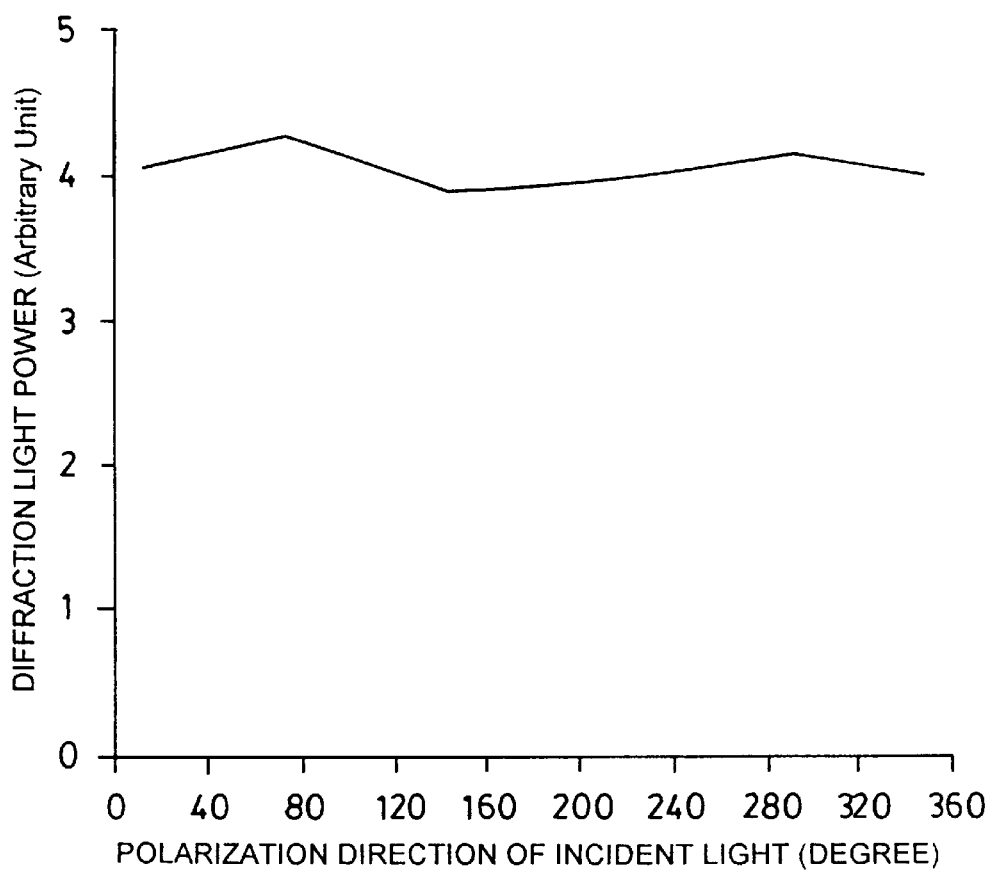
FIG. 5 is a plot of diffraction light power versus polarization direction of the incident light showing the polarization insensitive performance of the device in FIG. 2.

A polarization insensitive WDM device was constructed by writing two sets of gratings on a $LiNbO_3$ crystal, one set of gratings designed to diffract TE polarized light and the other set designed to diffract TM polarized light. The exposure time of the crystal to the laser was controlled during production of the gratings so that the two sets of gratings gave substantially equal diffraction efficiency. Under these conditions, when the polarization state of incident light changes, the diffraction efficiency is relatively the same. FIG. 5 illustrates the polarization change induced output power variation of less than five percent. A polarizer was used to change the polarization state of the input laser beam in the experiments which provided the data of FIG. 5.

The diffraction efficiencies and wavelength resolution of the WDM devices disclosed herein may be tuned by varying the grating strength and length while the channel spaced may be tuned by the tilted angle of the etalon. Another advantage of these WDM devices is they are not limited to any particular material or to a particular method of producing the gratings. The optimized diffraction efficiency may approach 100% and the wavelength resolution may reach subnanometer. Further distinct advantages of the present invention relates to the fact that the configurations disclosed herein use a simple strategy to multiplize the wavelength channels without imposing added complexity on the diffraction structure. In addition to simplicity of implementation and high efficiency, the signal-to-noise ratio limited channel density and channel number of the present devices is high. By way of comparison, Mach-Zehnder interferometer devices require very precise 3-dB couplers and have a sinusoidal response which does not readily yield high levels of crosstalk rejection. Another approach, based on planar grating diffraction, is prone to coupling and scattering more losses and noise with the increasing of wavelength channels. The insertion loss of the WDM devices disclosed herein is about 10 dB.

The method and devices disclosed herein for wavelength division multiplexing have industrial utility in many fields of optoelectronics including but not limited to optical communication and sensor systems.

Further, those skilled in the art will appreciate that the WDM devices disclosed herein may be modified for use as wavelength sensors and frequency stabilizers. As described above, when a beam of light is directed through the volume diffraction grating in the etalon structure, depending on the incident beam direction, there will be, for each traversal, a corresponding beam of light of known wavelength diffracted that satisfies a Bragg condition. Therefore, the WDM devices disclosed herein can be used as wavelength detectors and the wavelength spacing of the output channels is adjusted according to the accuracy requirements of the particular application.

The present invention has been described with respect to the preferred embodiments, namely an grating-in-etalon with one or both reflective faces being tiltable with respect to the other and a etalon waveguide structure with opposed reflective faces fixed at a preselected angle with respect to each other. However, those skilled in the art will appreciate that the foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A wavelength division multiplexing device, comprising;
   etalon means having a pair of opposed faces, said opposed faces each having a face portion thereof which is highly reflective, said highly reflective face portions being disposed at a preselected angle with respect to each other, said preselected angle being non zero such that said highly reflective face portions are non-parallel with respect to one another; and
   volume diffraction grating means positioned between said highly reflective opposed face portions so that a light beam incident on said etalon means undergoes a preselected number of multiple reflections between said highly reflective face portions and a preselected number of traversals through said volume diffraction grating means, and whereby wavelengths satisfying a Bragg condition on each traversal are diffracted out of said volume diffraction grating means.

2. The device according to claim 1 wherein said volume diffraction grating means is selected from the group consisting of single Bragg diffraction gratings, multiple superimposed Bragg diffraction gratings, and binary Bragg supergratings.

3. The device according to claim 2 wherein said opposed faces are spaced from said volume diffraction grating means to provide a gap between said volume diffraction grating means and each opposed face, and wherein when a light beam is multiply reflected between said highly reflective opposed face portions said light beam makes multiple traversals through said volume diffraction grating means with each traversal being at a different angle than previous traversals through said volume diffraction grating means whereby light satisfying a Bragg condition for each different traversal is diffracted out through said volume diffraction grating means at a different angle than light diffracted during the other traversals.

4. The device according to claim 3 including tilt means for adjustably tilting said opposed faces at a preselected angle with respect to each other.

5. The device according to claim 4 wherein one of said opposed faces is fixed, and wherein said tilt means is connected to the other of said opposed faces for adjustably tilting it with respect to the opposed fixed face.

6. The device according to claim 4 wherein said tilt means includes tilt means connected to each of said opposed faces for tilting both faces independently.

7. The device according to claim 3 wherein said opposed faces are fixed at a preselected angle with respect to each other.

8. The device according to claim 3 wherein said volume diffraction grating means comprises a set of gratings for diffraction of TE polarized light and another set of gratings for diffraction of TM polarized light.

9. The device according to claim 3 wherein said volume diffraction grating means has a preselected length and grating pitch.

10. The device according to claim 9 wherein said volume diffraction grating means has a preselected index of refraction change for each grating pitch.

11. The device according to claim 3 wherein each said opposed faces comprise an optically transparent substrate with a reflective coating applied to a portion of one of said optically transparent substrate, said reflective coating having a preselected reflection coefficient.

12. The device according claim 3 including light detection means for detecting light exiting said volume diffraction grating means.

13. The device according to claim 12 wherein said light detection means includes an array of detectors positioned to intercept the beams diffracted at said different angles from said volume diffraction grating means.

14. The device according to claim 2 wherein said etalon means is an etalon waveguide comprising a substrate, a waveguide on a surface of said substrate, said waveguide having a pair of first opposed highly reflective end faces corresponding to said highly reflective face portions, said end faces being disposed at said preselected angle with respect to each other, said volume diffraction grating means being located in said waveguide, said waveguide having a pair of opposed output faces, and wherein when a light beam is multiply reflected between said highly reflective end faces said light beam makes multiple traversals through said volume diffraction grating means with each traversal being at a different angle than previous traversals through said volume diffraction grating means whereby light satisfying a Bragg condition for a particular traversal is diffracted out of said volume diffraction grating means through one of said output faces at a different angle than light diffracted during the other traversals.

15. The device according to claim 14 wherein said volume grating includes at least two gratings written into said waveguide, a first of said gratings operable to diffract ordinary polarized light and a second grating operable to diffract extraordinary polarized light.

16. The device according claim 15 including light detection means for detecting light exiting said output faces, said light detection means including an array of detectors positioned to intercept the beams diffracted at said different angles from said output faces.

17. The device according to claim 16 wherein said output faces have an antireflection coating thereon, and wherein one of said first opposed faces has a light beam input portion having an antireflection coating thereon.

18. The device according claim 14 including light detection means for detecting light exiting said output faces, said light detection means including an array of detectors positioned to intercept the beams diffracted at said different angles from said output faces.

19. The device according to claim 18 wherein said output faces have an antireflection coating thereon, and wherein one of said first opposed faces has a light beam input portion having an antireflection coating thereon.

20. The device according to claim 19 wherein said etalon waveguide includes a cladding layer on top of said waveguide, and wherein said volume diffraction grating means is located in said cladding layer.

21. A method of wavelength division multiplexing, comprising;
providing a volume diffraction means between reflective faces disposed at a preselected angle with respect to each other that is non zero such that said reflective faces are non-parallel with respect to one another;
multiply reflecting a beam of light through said volume diffraction grating means for a preselected number of traversals with each traversal of the beam through the volume diffraction grating means being in a different preselected direction whereby light satisfying a Bragg condition on each traversal is diffracted in a direction different from light diffracted during other traversals through said volume diffraction grating; and
detecting light diffracted in the different directions for the traversals of the light beam through said volume diffraction grating means.

22. The method according to claim 21 wherein the step of providing a volume diffraction grating means includes selecting said volume diffraction grating from the group consisting of single Bragg diffraction gratings, multiple superimposed Bragg diffraction gratings, and binary Bragg supergratings.

23. The method according to claim 22 wherein the step of providing a volume diffraction grating means includes selecting at least two superimposed gratings, a first of said gratings operable to diffract ordinary polarized light and a second grating operable to diffract extraordinary polarized light.

24. The method according to claim 22 wherein the step of multiply reflecting a light beam through a volume diffraction grating means includes adjusting the angle of traversal of a beam through the volume diffraction grating means by adjusting said preselected angle between a first of said reflective faces on a first side of said volume diffraction means with respect to a second reflective face opposed to said first face on another side of said volume diffraction grating means.

* * * * *